April 14, 1964

L. I. BENJAMEN 3,128,741

MARINE ENGINE MOUNT

Filed Sept. 8, 1961

LYSLE I. BENJAMEN
INVENTOR.

BY
*Teagno + Stover*
ATTORNEY

April 14, 1964

L. I. BENJAMEN 3,128,741

MARINE ENGINE MOUNT

Filed Sept. 8, 1961

LYSLE I. BENJAMEN
INVENTOR.

BY Guagno & Stover
ATTORNEY

United States Patent Office 3,128,741
Patented Apr. 14, 1964

3,128,741
MARINE ENGINE MOUNT
Lysle I. Benjamen, Birmingham, Mich., assignor to Eaton Manufacturing Company, Cleveland, Ohio, a corporation of Ohio
Filed Sept. 8, 1961, Ser. No. 136,779
6 Claims. (Cl. 115—34)

Broadly, this invention relates to an engine mounting means and more particularly, pertains to an engine mounting means for inboard engines utilized to power marine vessels, pleasure craft, etc.

An important problem to be considered in the assembling of a boat hull with an engine concerns the relative angular disposition of the output shaft of the engine with respect to the hull whereby the proper location of the drive assembly including the propeller shaft and propeller can be readily positioned at a proper angle with respect to the direction of forward movement of the boat to enable the boat to plane with minimum propeller thrust loss.

To date, there are various types of marine power drives including outboard, inboard-outboard and conventional inboard type arrangements. Although the angular disposition of the output shaft of the power drive unit is important to all drives, the invention herein deals with the inboard-outboard types. When considering inboard-outboard type drives wherein the engine drive shaft extends through the transom and to which an outdrive is secured, the need for an adjustable engine mounting system becomes readily apparent. Due to the multiplicity of boat hull manufacturers, the angle of the transom with respect to the keel varies in different hull sizes and designs. Because of this variation in the angle of the transom, it imposes an assembly limitation on the engine installation operation in that for each boat hull in which the engine is to be placed, it necessitates relocating the support brackets for the rearward portion of the engine and associated units along with the repositioning and adjustment of the forward engine mountings in order to obtain the correct angular positioning of the output shaft.

Therefore, it is a principal object of this invention to provide a mounting means for a marine engine which can be adapted to any boat hull enabling the engine to be mounted in the boat hull and positioned at any desired angle determined by the type of drive unit and boat hull design.

It is another object of this invention to provide a mounting arrangement for a power transmitting drive unit whereby the engine can be pivoted about a fulcrum point connected to the boat hull.

It is still another object of the invention to provide a support arrangement for a power transmitting drive unit, wherein a three-point suspension is utilized in the environment of a boat hull.

It is a further object of this invention to provide a mounting support means for a power transmitting drive unit which is simple in structure and readily adaptable to any inboard-outboard drive and boat hull combination unit.

These and other obbjects of the invention will become readily apparent from the following description taken in connection with the accompanying drawing, in which.

Figure 1:
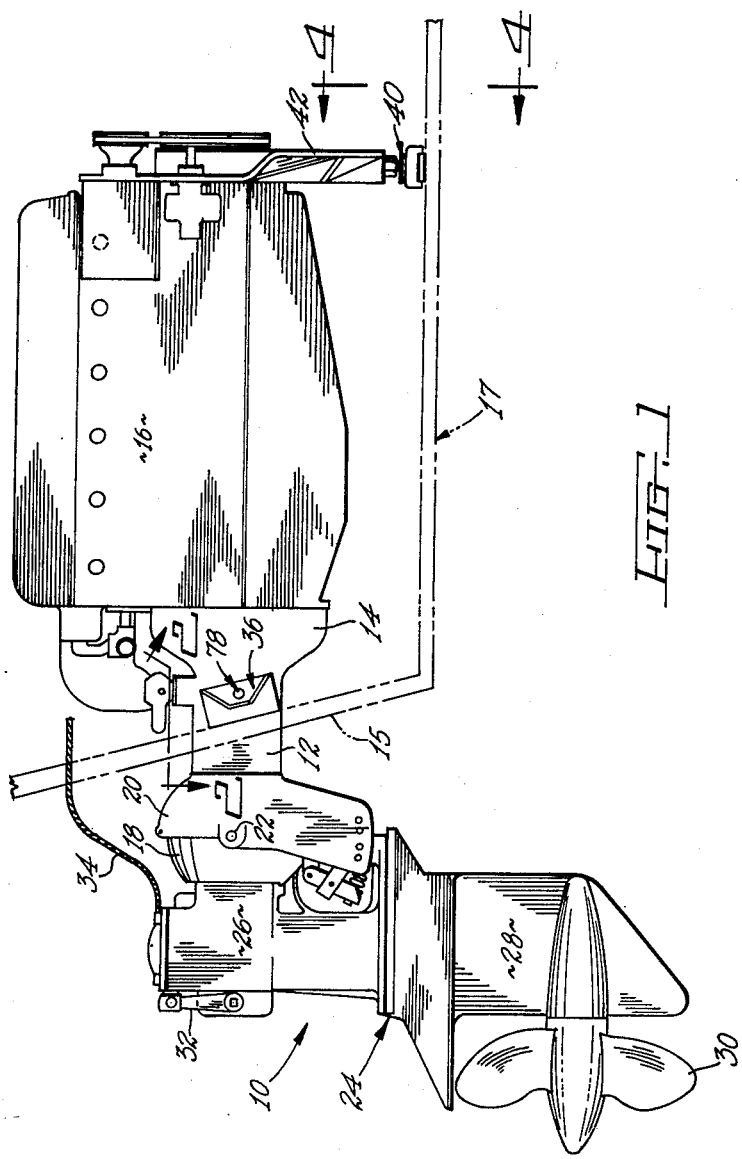
FIGURE 1 is a side elevational view of a combination engine and inboard-outboard drive unit illustrating a boat hull and its relationship thereto in broken lines and the location of the mounting arrangement with respect to the engine and boat hull.

Referring directly to FIGURE 1 of the drawing, an outboard power leg 10 is supported in a mounting support sleeve 12. The support sleeve forms a part of a bell housing 14 which is fixed to the prime mover or engine 16 disposed in and supported by a boat hull 17. A forward joint housing 18 is comprised of a sleeve portion (not shown) which is supported internally of the mounting support sleeve 12. A rearwardly disposed openfaced portion 20 of the joint housing provides a pivotal support for a yoke means (not shown) which is pivotally secured to the housing by bearing support means 22.

A power leg housing assembly 24 comprises an upper housing 26 and a power leg lower housing 28 connected by a plurality of bolts or other such securing means. A propeller 30 is mounted on and fixed for rotation with a shaft (not shown) forming a part of the internal drive unit connected to the output shaft of the prime mover (not shown). A shift arm 32 is oscillatably mounted in the power leg upper housing portion 26 and is movable responsive to actuation of a control cable 34 fixed thereto. The control cable, a portion of which is shown only, is manually controlled by the boat operator and provides the means for obtaining the desired direction of propeller rotation. The prime mover, being structurally fixed to the bell housing 14 and having flange 42 extending therefrom, is supported in a desired position by brackets 36 and 38 and a forward adjustable leg type support 40 relative to the boat hull according to the invention disclosed herein. The desired position of the engine is predetermined by the nature of the angular relationship of the transom with respect to the boat bottom as varied by boat manufacturers.

Figure 2:
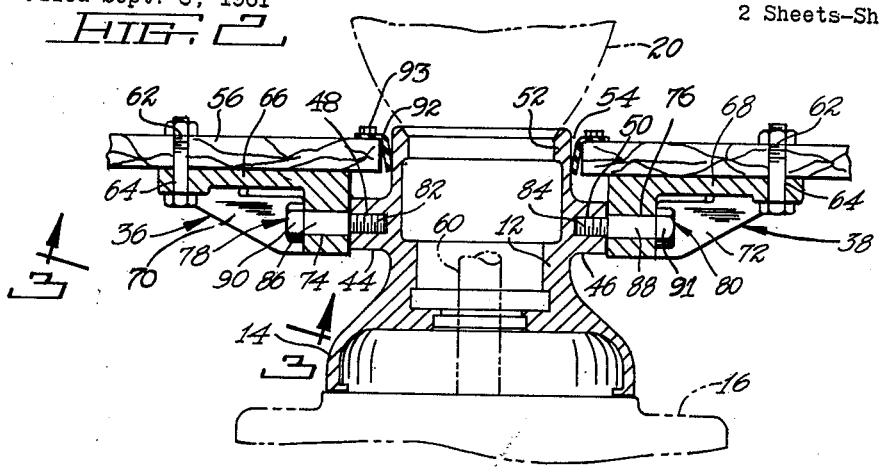
FIGURE 2 is a top view of a portion of the connecting means from the engine to the inboard-outboard drive unit taken along lines 2—2 of FIGURE 1.

The bell housing 14 has a pair of projecting portions or bracket connecting means 44 and 46 (FIGURE 2) diametrically opposed with respect to one another in a trunnion configuration in which openings 48, 50 are drilled and tapped to form a common axis therebetween. One end 52 of the bell housing which forms a portion of the mounting support sleeve 12 extends through an opening 54 formed in the transom 56 of the boat hull 17 and is integral with the forward joint housing 20 and accordingly, the power leg 10 of the drive unit. The drive shaft 60 connected to the prime mover, the prime mover and the forward joint housing of the outboard power leg unit are shown in broken line representation to more clearly indicate the relative positioning of the essential elements of the combination engine and inboard-outboard drive units with respect to the boat transom.

Figure 3:
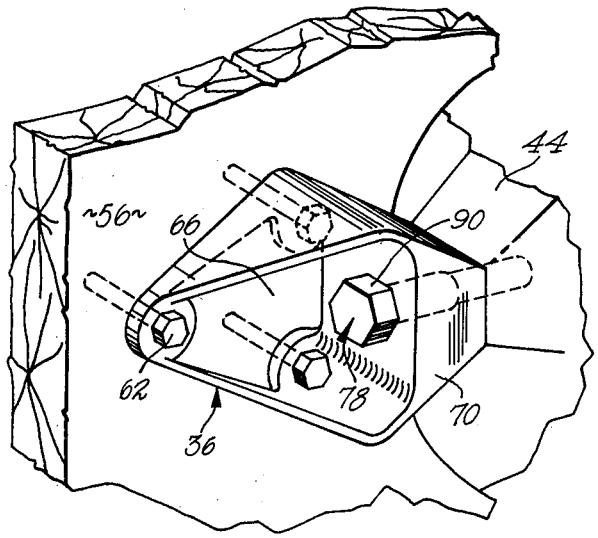
FIGURE 3 is a view in perspective taken along lines 3—3 of FIGURE 2 illustrating the relative location of the support means in relationship to the transom and the drive unit.

The pair of brackets 36 and 38 are fixed to the transom by a series of bolts 62 extending through openings 64 formed in base plates 66 and 68 of brackets 36 and 38, respectively (FIGURE 3). Projecting portions 70 and 72 extend substantially normal to the transom and are formed integral with the base plates 66 and 68, respectively. Openings 74 and 76 are formed in the projections 70 and 72 in which support pins 78 and 80 are disposed. The support pins 78 and 80 comprise threaded bolts of substantial size suitable to carry the power transmitting unit wherein a portion of the stems 82 and 84 of bolts 78 and 80, respectively, are threaded. The intermediate portions 86 and 88 thereof between the threaded end portions and the head portions 90 and 91 have a smooth lateral surface to form a journal support for openings 74 and 76 formed in the support brackets. Upon assembly, the pins or bolts extend inwardly along the axis formed by the aligned openings 74 and 76 in the projected portions 70 and 72, respectively, and are secured in the openings by the threaded end portions 82 and 84 thereof. The bell housing 14 and engine 16 accordingly are able to pivotally move about the axis formed by the pins and bracket openings and are supported on the journal surfaces formed by the intermediate portions 86 and 88 of the bolts.

A rubber boot 92 is secured to the transom 56 circumferentially encompassing the opening 54 in the transom with one end of the boot being compressed to form a substantially water-tight seal about the support sleeve 12 by suitable means (not shown) to prevent the back-wash of water to enter into the boat through the transom opening. A circular metal ring 93 is bolted to the outside surface of the transom and accordingly, compresses the boot between the ring and the transom and thereby forms a seal on the outside surface portion of the transom.

Figure 4:
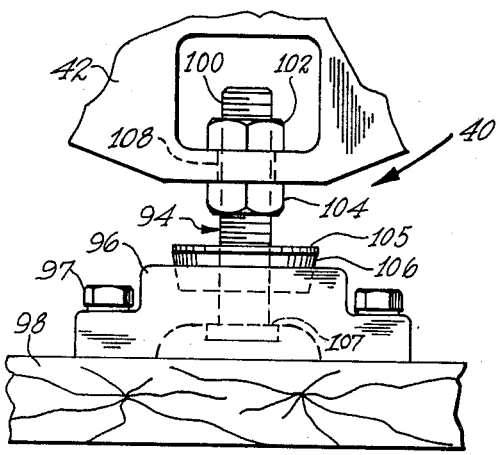
FIGURE 4 is a front view taken along lines 4—4 of FIGURE 1 illustrating the adjustable mounting means disposed in engagement with the forward position of the engine and the boat hull bottom.

The forward adjustable leg type support 40 (FIGURE 4) comprises a bolt or stud portion 94 and a base plate 96 which can be formed integral with or attached to the hull of the boat by bolts 97 at the bottom portion 98 thereof, as shown. The stud has a threaded end portion 100 to which a pair of adjustable nuts 102 and 104 are threadedly engageable therewith. A washer 105 is axially secured to the stud 94 and forms a backup plate for a rubber or other resilient material bushing 106. The bushing 106 is disposed intermediate the washer and the base plate and is in engagement with the base plate 96. The stud has a shoulder portion 107 at one end thereof in engagement with the base plate thereby preventing removal of the stud from the base plate in an axially outward direction. The forward leg support is located at the forward end portion of the engine and is substantially centrally disposed thereof. The support flange bracket 42 extends downwardly from the engine and is engageable with stud 94 through an opening 108 formed in the flange. The opening 108 has a diameter slightly larger than the stud whereupon the support flange upon engagement with the stud rests firmly against the lower adjusting nut 104. The upper adjusting nut 102 is threadedly engaged to the stud and upon tightening, the flange is disposed about the stud and intermediate the adjusting nuts. From this arrangement, the relative location of the support flange 42 and the engine can be adjusted by rotation of the nuts about the stud. Thus the engine through the movement of the adjusting nuts is adjustably pivoted about the axis of the support pins disposed in the brackets. In an inboard-outboard arrangement, a force created by propeller thrust tending to lift the engine in an upward direction from the stud is absorbed by nut 102 and stud 94. Accordingly, axial force applied to the stud in a downward direction is transferred to the plate through the resilient bushing material thereby providing a damping effect against engine vibration and a shock absorbing function.

In this arrangement, it can be seen that the engine can be raised or lowered with respect to the boat hull bottom portion and accordingly, a desired position of the engine can be obtained through this type of adjustment. Although it is not illustrated in the drawing, the scope of the invention encompasses an arrangement wherein the inboard-outboard drive is bolted directly to the transom independent of the bell housing and the engine can be mounted in the identical manner whereby the engine alone could be pivoted about the support pins in the brackets and the inboard-outboard drive remain stationary with respect to the transom.

While the present invention has been described in connection with certain specific embodiments, it is to be understood that the foregoing description is merely exemplary and that the concept of this invention is susceptible of numerous other modifications, variations and applications which will be apparent to persons skilled in the art. The invention is to be limited, therefore, only by the scope of the appended claims.

I claim:

1. A marine engine mounting means for an inboard marine engine, said means comprising laterally spaced pivotal bracket means including means fixed to a transom of a boat, bracket supporting means fixed to said engine, means including said bracket means being effective to pivotally support said engine at the aft portion of said engine, means adapted to connect the forward portion of said engine to a hull portion of the boat, and means comprising an opening in said transom in power shaft receiving relationship with said engine and being disposed laterally between said bracket means so that said engine is rigidly laterally supported and the angle of the power shaft is positionable with respect to the angle of the transom.

2. A support means for a marine engine for use in combination with a boat hull, a through-transom type marine drive including a substantially vertically disposed power leg, said support means comprising laterally spaced dual means fixed to said transom effective to support said engine at the aft portion thereof and single support means resiliently connecting the forward portion of said engine to said hull.

3. A mounting means for a marine engine for use in combination with a boat hull, a through-transom type marine drive including a substantially vertically disposed power leg, said mounting means comprising dual means fixed to said transom pivotally supporting said engine at the aft portion of said engine and a single support means connecting the forward portion of said engine to said hull for controlling up and down pivotal movement of said forward portion of said engine about said dual means fixed to said transom.

4. A support means for a marine power drive means for use in combination with a boat hull, a through-transom type marine drive including a substantially vertically disposed power leg, said power means including an engine, said support means comprising a pair of brackets fixed to said transom for pivotally supporting said engine at the aft portion thereof, said brackets forming a common axis therebetween, pin means cooperable with said brackets providing pivotal movement for the forward portion of said engine about said axis and a single forward leg support resiliently connecting said engine to said hull for selectively adjusting up and down movement of said forward portion of said engine.

5. A supporting and mounting means for the combination of a vertical outboard power leg and an inboard marine engine comprising a first bracket means adapted to be fixed to a transom of a boat hull, a second bracket means laterally spaced from said first bracket means and being fixed to said transom, a bell housing substantially enclosing the rear of said engine and being connected thereto, first and second bracket connecting means fixed to said bell housing, means connecting said first bracket means with said first bracket connecting means for pivotal movement therebetween about an axis substantially parallel to the transom of the boat, further means connecting said second bracket means with said second bracket connecting means for pivotal movement about said axis, outboard power leg supporting means fixed to said bell housing and extending through said transom, seal means between said supporting means and said transom, and engine supporting means connected to the forward portion of said engine and said hull so that the forward portion of the engine is positionable upwardly or downwardly to effect pivotal movement of the engine about said axis to obtain the desired angle between the power leg supporting means and the transom.

6. A device according to claim 5 wherein said bell housing, said outboard power leg supporting means and said first and second bracket connecting means are formed as a single, unitary, one-piece element structurally supporting said outboard power leg and the rearward portion of the engine.

References Cited in the file of this patent

UNITED STATES PATENTS

| | | |
|---|---|---|
| 1,490,046 | Turnbull | Apr. 8, 1924 |
| 1,725,252 | Campbell | Aug. 20, 1929 |
| 1,783,331 | Fahrney | Dec. 2, 1930 |
| 1,831,739 | Decker | Nov. 10, 1931 |